US012711101B2

(12) United States Patent
Maletich et al.

(10) Patent No.: US 12,711,101 B2
(45) Date of Patent: Aug. 18, 2026

(54) SYSTEMS AND METHODS FOR MANAGING A UNIFIED METADATA DATABASE

(71) Applicant: RELATIVITY ODA LLC, Chicago, IL (US)

(72) Inventors: Michael Maletich, Chicago, IL (US); Sanmeet Kanhere, Chicago, IL (US); Alex Wilcoxson, Chicago, IL (US); Greg Ott, Chicago, IL (US)

(73) Assignee: RELATIVITY ODA LLC, Chicago, IL (US)

(*) Notice: Subject to any disclaimer, the term of this patent is extended or adjusted under 35 U.S.C. 154(b) by 0 days.

(21) Appl. No.: 18/990,435

(22) Filed: Dec. 20, 2024

(65) Prior Publication Data

US 2025/0209040 A1 Jun. 26, 2025

Related U.S. Application Data

(60) Provisional application No. 63/613,523, filed on Dec. 21, 2023.

(51) Int. Cl.

| | |
|---|---|
| ***G06F 16/14*** | (2019.01) |
| ***G06F 16/17*** | (2019.01) |
| ***G06F 16/22*** | (2019.01) |
| ***G06F 16/23*** | (2019.01) |
| ***G06F 16/2455*** | (2019.01) |

(52) U.S. Cl.

CPC .......... *G06F 16/14* (2019.01); *G06F 16/1734* (2019.01); *G06F 16/2282* (2019.01); *G06F 16/2379* (2019.01); *G06F 16/24554* (2019.01); *G06F 16/2456* (2019.01)

(58) Field of Classification Search

CPC .. G06F 16/14; G06F 16/1734; G06F 16/2282; G06F 16/2379; G06F 16/24554; G06F 16/2456

USPC .......................................................... 707/820

See application file for complete search history.

(56) References Cited

U.S. PATENT DOCUMENTS

2005/0149583 A1* 7/2005 Baskaran .............. G06F 16/219 707/999.203
2016/0171025 A1* 6/2016 Ji .......................... G06F 16/235 707/747
2018/0075076 A1* 3/2018 Sawhney .............. G06F 16/219
2019/0065525 A1* 2/2019 Malhotra .............. G06F 16/185
2024/0311369 A1* 9/2024 Grabs ................. G06F 16/2456

* cited by examiner

*Primary Examiner* — Shahid A Alam
(74) *Attorney, Agent, or Firm* — MARSHALL, GERSTEIN & BORUN LLP; William J. Samore

(57) ABSTRACT

The following relates generally to managing data and more particularly relates to managing metadata. In some embodiments, one or more processors: detect an update to metadata associated with an object maintained in a long-term database; create a delta table indicative of the update to the metadata associated with the object, wherein a metadata storage table indicates an association between the object metadata and the delta table; detect a publish command associated with the object; and in response to detecting the publish command, merge a change from the delta table to the object metadata associated with the object in the metadata storage table.

20 Claims, 8 Drawing Sheets

FIG. 2B
250
Hi Jim,
I was hoping to schedule a meeting with you for next Tuesday at 4pm. We can use the Main Conference Room if that works for you.
270
260
Thanks!
Bill
Associate
XYZ Corp.
1234 Main St.
San Francisco, CA 95552

300

| Date | Time | Message Sender | Message Recipient | Participants | Privilege | Communication Channel | Relevancy Score | Highlighting Model | Message Contents | Association Between Object and Delta Table |
|---|---|---|---|---|---|---|---|---|---|---|
| ### | ### | ### | ### | ### | ### | ### | ### | ### | ### | ### |
| ### | ### | ### | ### | ### | ### | ### | ### | ### | ### | ### |
| ### | ### | ### | ### | ### | ### | ### | ### | ### | ### | ### |
| ### | ### | ### | ### | ### | ### | ### | ### | ### | ### | ### |

| Message Recipient | Participants |
|---|---|
| ### | ### |
| ### | ### |
| ### | ### |
| ### | ### |

FIG. 3B

SYSTEMS AND METHODS FOR MANAGING A UNIFIED METADATA DATABASE

CROSS-REFERENCE TO RELATED APPLICATIONS

This application claims priority to U.S. Patent Application No. 63/613,523, entitled "SYSTEMS AND METHODS FOR MANAGING A UNIFIED METADATA DATABASE" (filed Dec. 21, 2023).

FIELD

The present disclosure generally relates to managing data and more particularly relates to managing metadata.

BACKGROUND

When gathering communications (e.g., as part of a discovery process for a trial, etc.), the communications may be in different formats (e.g., short message service (SMS), email, text messages from different applications (apps), etc.). It may thus be useful to convert the communications to a standardized format before further processing the communication (e.g., analyzing the communication with software and/or presenting the communication to a human reviewer). Often these formats compile a significant number of component documents into a single file. For example, it is not uncommon for the files to be over 100 MB in size.

When performing analytics on a file that includes a large number of component messages, it may be helpful to analyze and label the individual messages (and/or groupings of messages) with the file. Accordingly, the file format may specify a specific bit order at which the labels associated with the component messages are located within in the file. However, it is inefficient to sequentially parse a large file just to update the few bits associated with the label for an individual message and/or message grouping.

As another example, when automatically processing documents, errors may occur. For example, there may be an error in optical character recognition (OCR), part of a document may be cut off during a scanning process, etc. As such, error(s) may be discovered, it may be desirable to correct the error(s), such as by updating a metadata field associated with the unstructured text included in the document. However, if the version of the document that includes the processing error has been published, this creates the challenges in maintaining different versions of the document metadata.

The systems and methods disclosed herein provide solutions to these challenges.

SUMMARY

In one aspect, a computer-implemented method for managing metadata may be provided. For instance, in one example, the method may include: (1) detecting, via one or more processors, an update to object metadata associated with an object maintained in a long-term database; (2) creating, via the one or more processors, a delta table indicative of the update to the metadata associated with the object, wherein a metadata storage table indicates an association between the object metadata and the delta table; (3) detecting, via the one or more processors, a publish command associated with the object; and (4) in response to detecting the publish command, merging, via the one or more processors, a change from the delta table to the object metadata associated with the object in the metadata storage table. The method may include additional, fewer, or alternate actions, including those discussed elsewhere herein.

In another aspect, a computer system for managing metadata may be provided. For example, in one instance, the computer system may include one or more processors configured to: (1) detect an update to object metadata associated with an object maintained in a long-term database; (2) create a delta table indicative of the update to the metadata associated with the object, wherein a metadata storage table indicates an association between the object metadata and the delta table; (3) detect a publish command associated with the object; and (4) in response to detecting the publish command, merge a change from the delta table to the object metadata associated with the object in the metadata storage table. The computer system may include additional, less, or alternate functionality, including that discussed elsewhere herein.

In yet another aspect, a computer device for managing metadata may be provided. For instance, in one example, the computer device may include: one or more processors; and/or one or more memories coupled to the one or more processors. The one or more memories including computer executable instructions stored therein that, when executed by the one or more processors, may cause the one or more processors to (1) detect an update to object metadata associated with an object maintained in a long-term database; (2) create a delta table indicative of the update to the metadata associated with the object, wherein a metadata storage table indicates an association between the object metadata and the delta table; (3) detect a publish command associated with the object; and (4) in response to detecting the publish command, merge a change from the delta table to the object metadata associated with the object in the metadata storage table. The computer device may include additional, less, or alternate functionality, including that discussed elsewhere herein.

BRIEF DESCRIPTION OF THE DRAWINGS

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

The figures described below depict various aspects of the applications, methods, and systems disclosed herein. It should be understood that each figure depicts an embodiment of a particular aspect of the disclosed applications, systems and methods, and that each of the figures is intended to accord with a possible embodiment thereof. Furthermore, wherever possible, the following description refers to the reference numerals included in the following figures, in which features depicted in multiple figures are designated with consistent reference numerals.

FIG. 3A depicts an example metadata storage table in columnar form.

FIG. 3B depicts an example delta table in columnar form.

DETAILED DESCRIPTION

Overview

When gathering communications (e.g., as part of a discovery process for a trial, etc.), the communications may be in different formats (e.g., short message service (SMS), email, text messages from different applications (apps), etc.). It may thus be useful to convert the communications to a standardized format before further processing the communication (e.g., analyzing the communication with software and/or presenting the communication to a human reviewer). Often these formats compile a significant number of component documents into a single file. For example, it is not uncommon for the files to be over 100 MB in size.

When performing analytics on a file that includes a large number of component messages, it may be helpful to analyze and label the individual messages (and/or groupings of messages) with the file. Accordingly, the file format may specify a specific bit order at which the labels associated with the component messages are located within in the file. However, it is inefficient to sequentially parse a large file just to update the few bits associated with the label for an individual message and/or message grouping.

As another example, when an object, such as a document is received, various modules may update (e.g., process) the object. However, publishing the object after each update may result in delays and/or a longer processing time of the object.

As yet another example, when processing objects (e.g., documents), errors may occur. For example, there may be an error in optical character recognition (OCR), part of an object may be cut off during a scanning process, etc. As such error(s) are discovered, it may be desirable to correct the error(s), such as by updating the metadata field associated with the erroneous data (e.g., a data field that includes unstructured text included in the object). However, if the version of the object that includes the processing error has been published, this creates challenges related to maintaining different versions of the object metadata such that the published metadata is available to applications that interface with published objects and the unpublished updated metadata is available to processing applications that interface with unpublished objects.

Embodiments disclosed herein solve these challenges. For example, some embodiments create a delta table and/or a metadata storage table to solve these challenges. For instance, in some embodiments, when an update to an object is detected in a long-term database (e.g., when an updated object has been created or uploaded due to a discovered error, etc.), the system may create a delta table indicative of the update to the metadata. Upon a publication command, the system may merge changes from the delta table to metadata associated with the object in the metadata storage table.

Example Computing Environment

Figure 1:
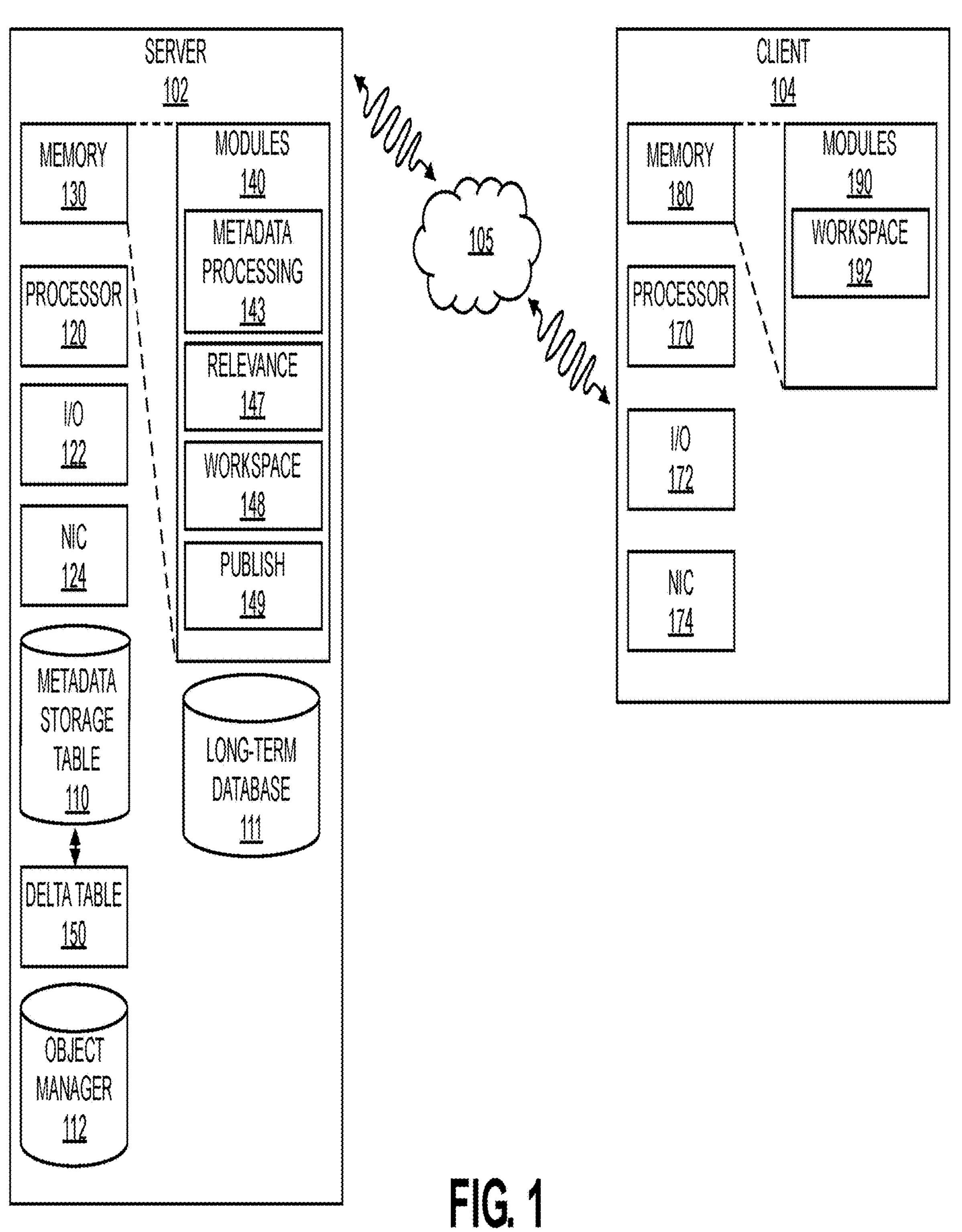
FIG. 1 depicts an example system for managing metadata.

FIG. 1 depicts an example computing environment 100 that may be used to implement the disclosed metadata management techniques. As illustrated, the environment 100 includes a server 102 communicatively coupled to a client device 104 via network 105. The network 105 may be a single communication network, or may include multiple communication networks of one or more types (e.g., one or more wired and/or wireless local area networks (LANs), and/or one or more wired and/or wireless wide area networks (WANs), such as the Internet). The server 102 may be a web server, a back-end server, or any combination thereof. While referred to in the singular, the server 102 may comprise any number of servers. Additionally, while FIG. 1 shows only a single client device 104, it is understood that multiple different client devices (of different entities and/or users), each similar to the client device 104, may be in remote communication with the server 102 via the network 105 and/or alternative networks.

As illustrated, the server 102 also includes a network interface controller (NIC) 124. The NIC 124 may include any suitable network interface controller(s), such as wired/wireless controllers (e.g., Ethernet controllers), and facilitate bidirectional/multiplexed networking over the network 105 between the server 102 and other components of the environment 100 (e.g., the client device 104, hardware units that form the server 102 in a distributed computing environment, etc.).

The server 102 includes a processor 120. While referred to in the singular, the processor 120 may include any suitable number of processors of one or more types (e.g., one or more microprocessors, one or more CPUs, one or more GPUs, etc.). Generally, processor 120 is configured to execute software instructions stored in one or more memories 130 (e.g., stored in a persistent memory such as a hard drive or solid-state memory) of the server 102. It should be appreciated that certain instructions may be more efficiently executed by different types of processors (e.g., generating an image rendering of an object may be more efficiently performed by a GPU, whereas as the establishment of a workspace may be more efficiently executed by a CPU). Accordingly, the server 102 may be configured to execute different instructions using the different processor types. Additionally, while FIG. 1 depicts a single processor 120 and a single memory 130, the processor 120 and the memory 130 may include any number of processors or processors, including processors and memories located in different physical units and connected via a distributed computing platform.

Generally, the server 102 hosts services relating to electronic object review (e.g., review of electronic objects, such as electronic documents), which may be accessed/utilized by the client device 104. For example, one service may relate to an eDiscovery object review service and another service may relate to conducting searches of object database(s). The software instructions stored in the memory 130, when executed by the processor 120, implement one or modules 140 that support the services. For example, a first module of the modules 140 is a workspace module 148 configured to establish the workspace of objects to be reviewed. For example, the workspace module 148 may implement one or more object collection modules for importing a plurality of objects into the workspace. As another example, the workspace module 148 may receive one or more search and/or filter queries to restrict a large corpus of objects down to a particularly relevant segment of the corpus. For instance, the workspace module 148 may receive a content-based query and a time-based query to reduce a patent document database from a corpus of over 10 million documents to a set of about 300,000 most relevant objects. Accordingly, the workspace module 148 may store objects associated with the workspace (and their corresponding metadata) into a long-term database 111.

Initially, when the server 102 receives an object, a metadata processing module 143 may analyze the object then populate a set of metadata associated with object attributes and generate a raw text file associated with any text in the object. Additionally, the metadata processing module 143 may fill metadata fields associated with review of the object (a relevancy selection, reviewer notes, and/or other fields) with default values.

The processing done by the metadata processing module 143 may be used to fill in information in the long-term database 111 (e.g., via a processing pipeline). In some implementations, the long-term database 111 may be referred to as an invariant database. The long-term database 111 may be implemented using a relational database management system (RDBMS), such as MySQL, PostgreSQL, Oracle, etc. or a non-relational database structure, such as a NoSQL structure.

Figure 2A:
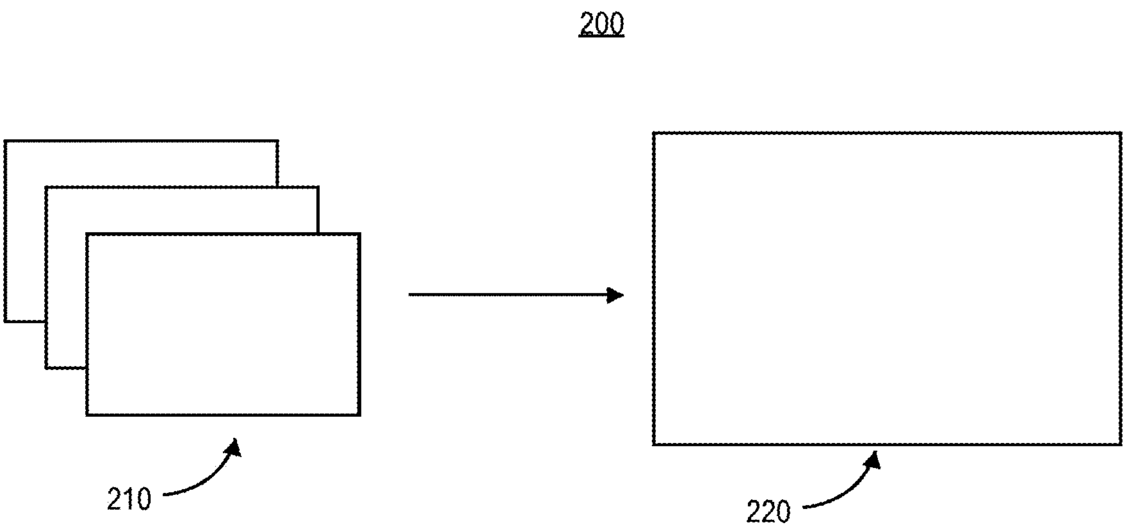
FIG. 2A depicts an example pipeline for processing a corpus of emails.

To further elaborate, FIG. 2A depicts an example processing pipeline 200. The example processing pipeline 200 may begin by obtaining a corpus of emails 210 (e.g., a collection of emails) that are to be ingested into the customer workspace 148. In the example processing pipeline 200, an ingestion application may implement an email threading process to convert the individual emails of the corpus of emails 210 (e.g., via the metadata processing module 143) into threaded email chains. In some embodiments, this process further includes de-duplicating emails in the corpus 210 and/or applying any annotation rules (e.g., highlighting and/or redaction sets) to produce output objects 220 (e.g., a threaded email document that is stored in the long-term database 111 that references metadata stored in the metadata storage table 110).

After the object 220 is produced, the ingestion application may publish the object 220 such that it is made available to other applications that interface with published objects in the workspace 148 (e.g., an object review application, a production application, etc.). However, it is sometimes desirable to make further updates to the object metadata after the object 220 has been published. In this case, the object must be published again for any changes to the object metadata to be made available to these applications. Because publishing an object utilizes computational resources it may not be efficient to publish an object after each change to the object metadata is made, particularly as the object is in the middle of a processing pipeline that makes multiple changes to object metadata.

Figure 2B:
FIG. 2B depicts an example email including example highlighting added during the pipeline process.

In addition, in some instances, subsequent to filling in the information in the long-term database 111 and/or metadata storage table 110 (e.g., via the processing pipeline 200), an error in the object may be discovered. For example, as depicted by FIG. 2B, an exemplary email message 250 may include text 260 with highlighting 270 added (e.g., by the metadata processing module 143). However, it may be discovered that the highlighting 270 is erroneous (e.g., the highlighting highlights the wrong text, the highlighting should not have been added, etc.). Additionally, a highlighting dataset associated with the workspace 148 may change, causing the highlighting metadata associated with the object to no longer reflect the customer preferences.

Figure 2C:
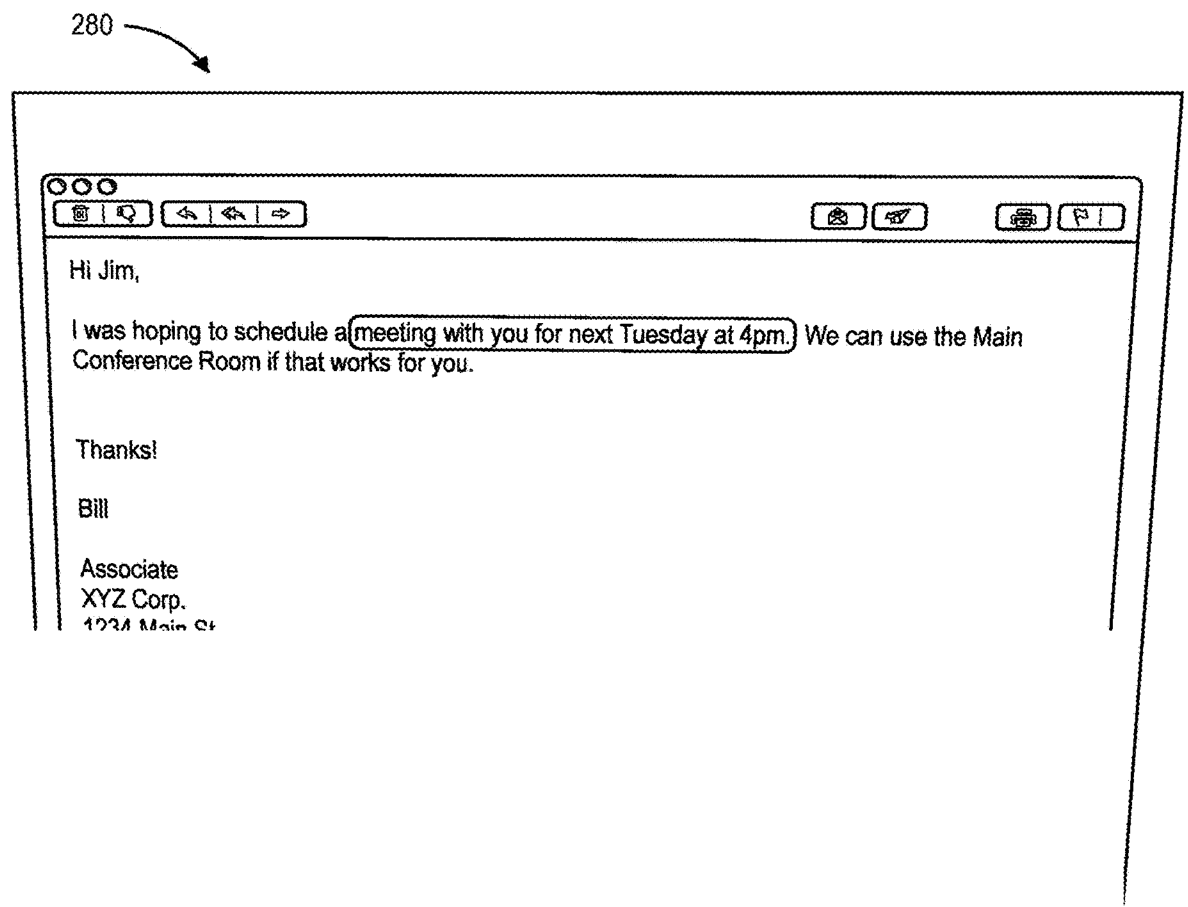
FIG. 2C depicts an example email with part of the example email being cut off during the scanning process.

In another example of a discovered error, a person may have attempted to scan printed emails, but the scanning process cut off part of the email, such as illustrated by the example email 280 of FIG. 2C. In another example, there may have been an error in an OCR process and/or a file conversion process.

To solve these problems and others, some embodiments create a delta table 150 (e.g., associated with the metadata storage table 110). In some embodiments, the delta table 150 is a relational data table referenced by objects in the metadata storage table 110. Of course, any other suitable storage location for associating object metadata and changes thereto may be implemented in other embodiments. In some examples, the delta table 150 is part of a columnar storage system, such as illustrated by the example metadata storage table 300 of FIG. 3A.

In the illustrated example, the metadata storage table 300 has a row for each message, and has columns for date, time, message sender, message recipient, participants (e.g., the message is part of a group chat, an email chain, etc.), privilege (e.g., an indication of if the message is protected by attorney-client privilege or other privilege), communication channel (e.g., SMS, email, a message via a particular app, etc.), highlighting model (e.g., highlighting and/or redaction information, such as highlighting or redaction automatically or manually added, etc.) and message contents (e.g., the text of the message). It should be understood that the long-term database 111 may store metadata of objects in columnar form similar to the form illustrated by the example of metadata storage table 300 (e.g., with similar columns).

In some embodiments, the metadata storage table 300 is relational table that points to a delta table that corresponds to an object or, in some embodiments, a plurality of component messages (thereby ensuring common column structures for a collection of messages). Storing the messages in columnar form has certain advantages. For instance, the database may be searched through more easily because, for example, only particular columns (rather than entire objects) must be searched (e.g., when searching for a sending party, only the sending party column must be searched). In another example, the columnar form leads to faster text retrieval (e.g., only the raw text must be retrieved rather than text along with formatting and/or text along with other metadata).

In some examples, the delta table has the same columns is the metadata storage table 300. In some such examples, if only a particular column is being updated, only information of that column is filled in. However, in other examples the delta table has columns only for updates that are being made. FIG. 3B illustrates such an example. In the example delta table 310 only the message recipient and participants are being updated, and thus the delta table 310 includes only those 2 rows. In some embodiments, when there are multiple updates to a single object that have not yet been published, a new row in the delta table 150 is created for each update.

The metadata storage table 110 (and/or delta table 150) may indicate associations between the object and the delta table 150, such as by including a reference(s) to the object. The reference may be any suitable reference, such as an object ID number of an object. In some examples, the object ID number comprises a hash of the data of the object. Additionally or alternatively, there may be references for individual messages (e.g., messages ID numbers, such as hashes of messages).

In some embodiments, the association between the object and the delta table 150 is included in a field in the metadata storage table that indicates one or more rows in the delta table 150 that stores the updated metadata.

In addition, although only one delta table 150 is shown in FIG. 1, there may be multiple delta tables 150 (e.g., one delta table for each object, object collection, and/or object subpart). To this end, different object types may be associated with different metadata fields. For example, communication objects may include a To:, a cc:, or a bcc: field associated with text object. Accordingly, having different delta tables enables the different metadata fields to be tracked without requiring placeholder/null values for the metadata fields not relevant to a particular object type. This enables more efficient storage of the metadata which is particularly important for large object corpuses (e.g., corpuses with over 1 million objects).

A publish module 149 may be configured to detect commands to publish any pending changes in the delta table(s) 150 to the metadata storage table 110. The publish command may be issued by a software module (e.g., in response to a workflow including a publish command or in response to a user interaction) and/or at periodic intervals. The publication process may cause any or all of the data in the delta table(s) 150, 310 to be merged into the metadata storage table 110. If there are multiple changes for a particular metadata field associated with a single object, the publish module 149 may select the most authoritative version of the metadata field (typically the most recent version) when merging the changes.

The object manager 112 may associate locations of an object in the long-term database 111 and the corresponding object metadata as maintained in the metadata storage table 110. The object manager 112 may be detect requests to access object metadata from various module 140. If the module 140 is not permitted to access unpublished metadata, the object manager 112 may provide the object metadata from the metadata storage table 110 to the requestor. On the other hand, if the module 140 is permitted to access unpublished metadata, the object manager 112 may synchronize any changes in the delta tables 150 with the metadata in the metadata storage table 110 and provide the synchronized metadata to the requestor. Accordingly, the object manager 112 is able to process requests for both published and unpublished metadata by accessing the same location in the metadata storage table 110.

By maintaining the metadata separate from the object itself, the metadata can be modified without changing the underlying object. Similarly, if an updated version of an object is imported in the client workspace, the previous metadata can be associated with the new version of the object by updating the references maintained at the object manager 112. As a result, any metadata associated with the prior object that is not impacted by the updates does not need to be updated, thereby reducing the amount of processing needed to ingest new versions of existing objects.

The server 102 may also be configured to execute a relevance module 147 to assign a relevancy score to objects within the workspace. For example, the relevance module 147 may maintain and update a machine learning model based upon input received from client devices 104 as to the relevancy of objects. To this end, the machine learning model may be trained to define a boundary in a multi-dimensional space to which the workspace objects are mapped. As inputs are received from client device 104, the relevance module 147 may update the algorithm for determining object relevancy values that are maintained in an object relevance metadata field metadata storage table 110 and/or a delta table 150. The relevancy scores may be recorded in the relevancy score column of the delta table 300.

In the illustrated example, the server 102 also includes one or more input/output (I/O) devices 122. For example, the server 102 may include a mouse or keyboard to enable a user to configure settings of the server 102, update and/or install the software modules 140, and/or perform various other server maintenance tasks. As another example, the server 102 may include a display screen via which a user is able to view one or more graphical user interfaces. It should be appreciated that in some embodiments, such as when the server 102 is part of a cloud computing environment, the server 102 may not include an I/O device 122.

The client device 104 may be a laptop computer, a desktop computer, a tablet, a smartphone, or any other suitable type of computing device. In the embodiment of FIG. 1, the client device 104 includes a processor 170. The processor 170 may include one or more microprocessors (e.g., one or more central processing units (CPUs) and/or one or more graphics processing units (GPUs)), for example. Additionally, the client device 104 includes a memory 180. The memory 180 may include program memory that stores software instructions that form one or more modules 190. Generally, the processor 170 is configured to execute software instructions stored in the program memory of the memory 180. The program storage may include one or more persistent memories (e.g., a hard drive and/or solid-state memory) and the data memory may include temporary memories, such as buffers, for storing the object models. In some embodiments, the data memory is a dedicated segment of a physical memory unit at the client device 104. Additionally or alternatively, the data memory may be a component of a graphics card or chipset included in the client device 104.

As illustrated, the client device 104 also includes a network interface controller (NIC) 174. The NIC 174 may include any suitable network interface controller(s), such as wired/wireless controllers (e.g., Ethernet controllers), and facilitate bidirectional/multiplexed networking over the network 105 between the client device 104 and other components of the environment 100 (e.g., another client device 104, the server 102, etc.). The client device also includes one or more I/O devices 172. For example, the client device 104 may include a display screen via which the graphical user interfaces described herein are displayed. As another example, the client device 104 may include a mouse, keyboard, and/or a touch screen to enable a user to interact with the various graphical user interfaces described herein.

The client device 104 may execute a workspace module 192 to interact with the workspace maintained at the server 102. For example, the client device 104 (and/or the user thereof) may be assigned a batch of messages for manual review. Accordingly, upon logging into the workspace, the workspace module 192 may fetch the batch of messages corresponding to the messages assigned to the user of the client device 104. As another example, the workspace module 192 may determine that the user is reviewing a list of sorted messages and fetch a portion of the messages corresponding to the sorted messages in accordance with the sorted list. In some examples, the fetched messages may be viewed via the I/O device 172.

Example Architecture

Figure 4A:
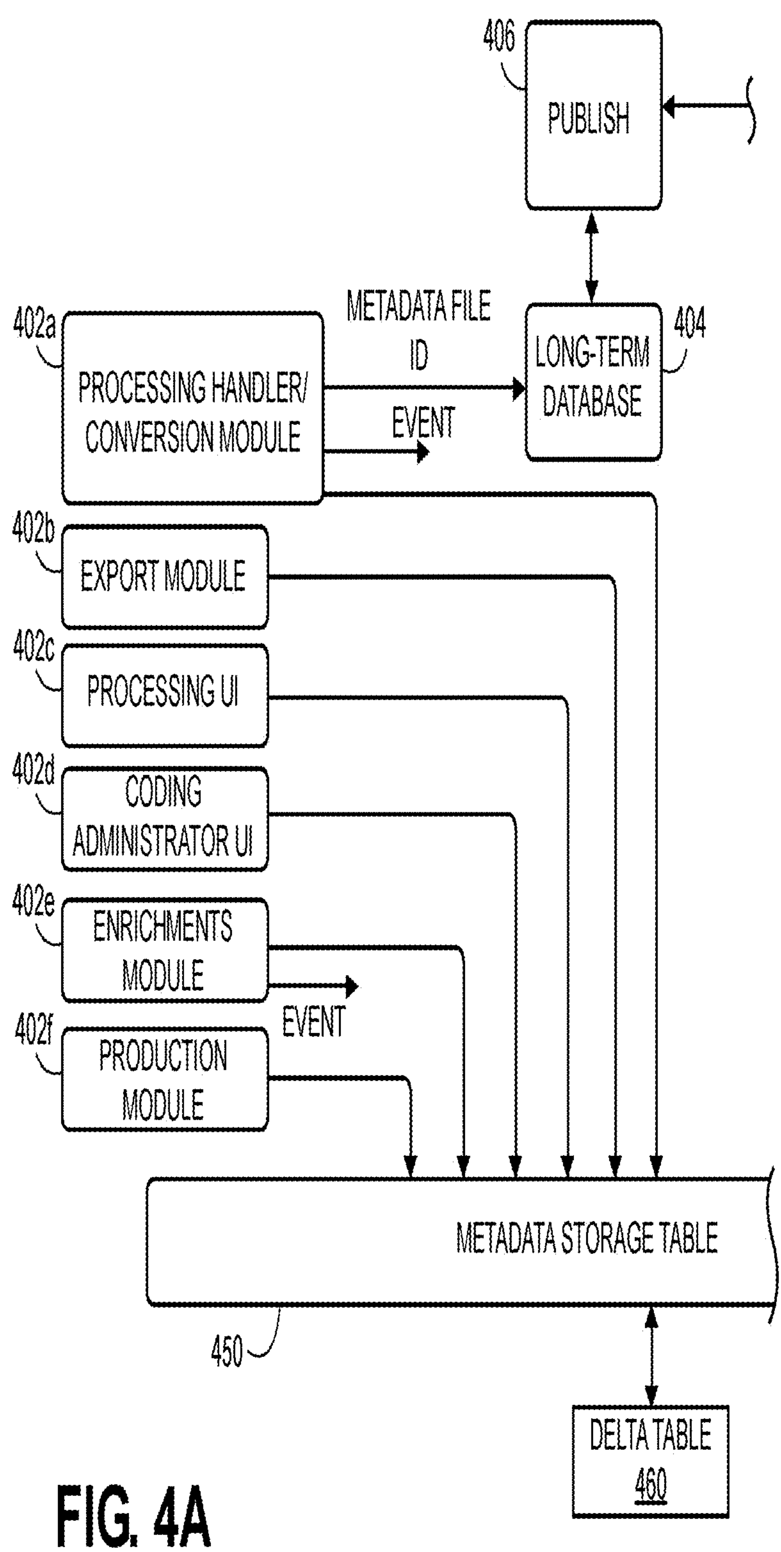
FIGS. 4A and 4B depict an example architecture of an example a client workspace managed by an example server, with FIG. 4B being an extension of FIG. 4A.
Figure 4B:
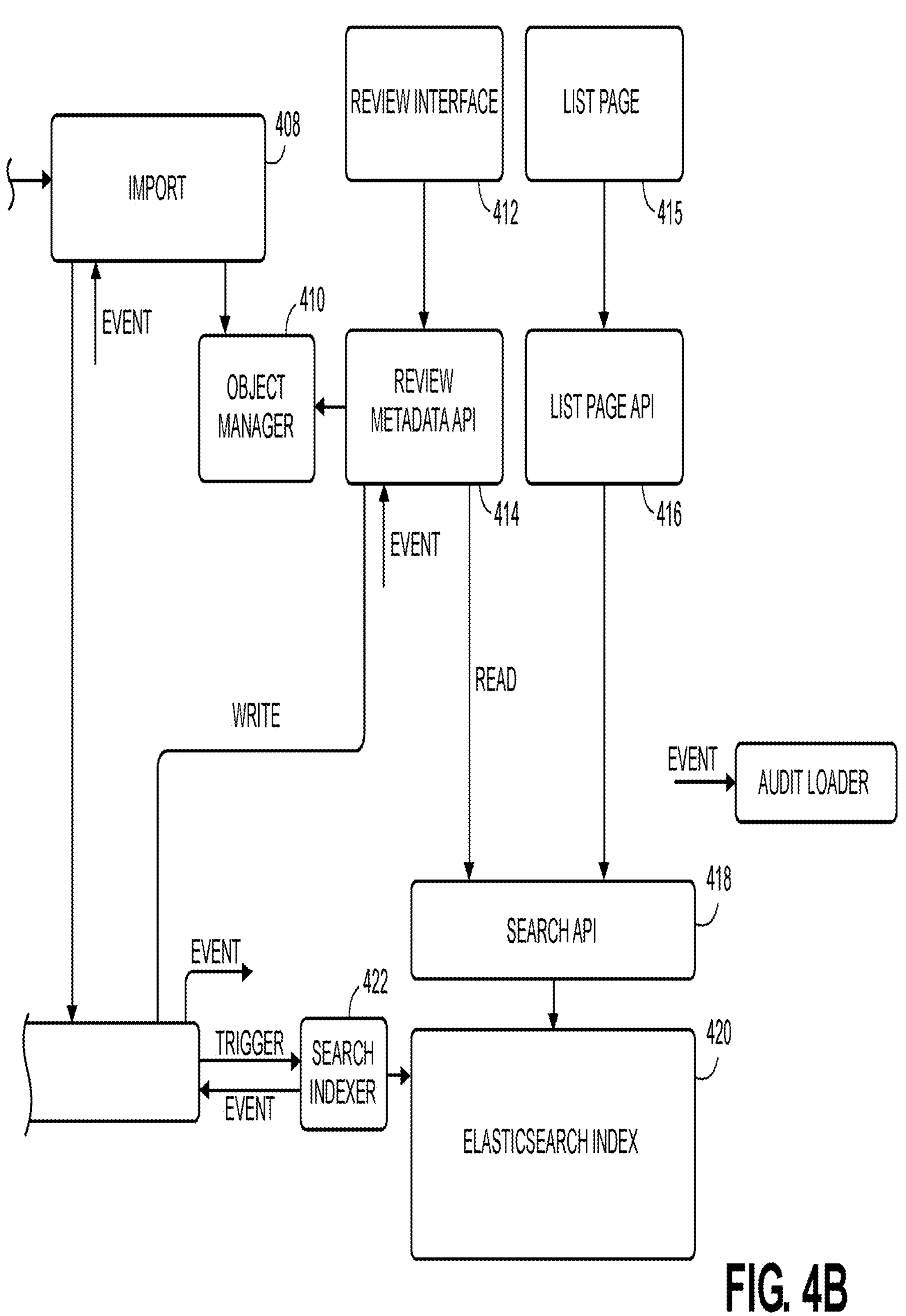

FIGS. 4A and 4B illustrate an example architecture 400 of a client workspace managed by the server 102, with FIG. 4B being an extension of FIG. 4A. In the example architecture 400, the processing handler/conversion module 402*a*, an export module 402*b*, a processing user interface (UI) 402*c*, a coding administrator UI 402*d*, an enrichments module 402*e*, and a production module 402*f* operate on the unpublished objects.

In some embodiments, the processing handler/conversion module 402*a* (which in some implementations may be the metadata module 143) may pre-process objects that are ingested into the client workspace for storage in a long-term database 404 (such as the long-term database 111). In some examples, the object is communication document object that comprises a plurality of component messages, such as a collection of messages corresponding to a particular time period (e.g., an hour, two hours, a day, etc.). The processing handler/conversion module 402*a* may convert and/or compile the plurality of component messages into a common format (such as a Relativity Short Media Format (RSMF) or other formats for compiling component messages in a conversation). The processing handler/conversion module 402*a* may then store the ingested object (and/or converted object) in the long-term database 404.

Additionally, the processing handler/conversion module 402*a* may extract and/or derive metadata from the object for storage in a metadata storage table 450 (such as the metadata storage table 110). In some embodiments, the metadata may be derived by executing one or more of the modules 402*b-f*.

The export module 402*b* may be configured to process objects for export. For example, the export module 402*b* may be configured to recombine the object and metadata into a single object that is provided to an endpoint.

The processing UI 402*c* may be a UI allowing a user to interface with objects and/or configure how the modules 402 interface with objects.

The coding administrator UI 402*d* may be a UI allowing a coding administrator to configure metadata associated with review of the objects (e.g., assigned reviewer, an indicator of whether the object is in a validation set, a batch identifier, a coding decision).

The enrichments module 402*e* may be configured to add metadata to objects ingested into the workspace.

The production module 402*f* may be configured to prepare any of the objects in the metadata storage table 454 for production. For example, the object may include metadata associated with at least one of a highlighting model, an annotation model, and a redaction model. The production module 402*f* may burn the highlighting, annotation, and/or redactions into the object as part of the production of the object.

In contrast to the above-discussed components that have access to unpublished object metadata, the object manager 410, the review interface 412, the list page 415, and search API 418 operate on the published documents, as will be discussed further below.

The publish module 406 in some implementations may be the publish module 149. As described above with respect to FIG. 1, the publish module 406 may publish any changes to object metadata maintained in a delta table 460 to be published to the metadata storage table 450 (e.g., upon receipt of a publish command, at periodic intervals, etc.). For example, the publication process may cause any or all of the data in the long-term database 404 to be merged into the metadata storage table 450, and/or cause the object manager 410 to update its reference(s) for the published data. The reference may be any suitable reference, such as an object ID number of an object. In some examples, the object ID number comprises a hash of the data of the object. There may also be references for individual messages (e.g., messages ID numbers, such as hashes of messages).

The import module 408 may facilitate the import of the data from the long-term database 404 to be viewed (e.g., at the review interface 412), and facilitate the update of the reference in the object manager.

The metadata storage table 450 may store the metadata of messages to be reviewed (e.g., at the client device 104, etc.). In some implementations, the metadata storage table 450 is the metadata storage table 110. In addition, in some embodiments the metadata storage table 450 includes one or more delta tables 460. In some embodiments, the delta tables 460 are the delta tables 150. However, in other embodiments, the metadata storage table 450 is relational table that points to a delta table 460 that corresponds to an object or, in some embodiments, a plurality of component messages (thereby ensuring common column structures for a collection of messages).

The review interface 412 (e.g., I/O 122) may facilitate the review of messages. For example, a human reviewer may use the review interface 412 to indicate (e.g., via the review metadata application programming interface (API) 414, etc.) that a message should be updated (e.g., due to a scanning error, OCR error, etc.). The review metadata API 414 may also read data from the search API 418, and write data to the metadata storage table 450. The search API 418 may also create an elastic search index 420, such as a search index divided into shards. Additionally or alternatively, the elastic search index 420 may be created by the search indexer 422. For example, the elastic search index 420 (or other search model) is able to incorporate the metadata file locations with the location of the object so that the processing applications can perform a search and still access the updated metadata.

The list page API module 416 may create a listing of all APIs. In some embodiments, when a new API is created, it is added as list page 415 to the listing.

In some embodiments, any or all of the object manager 410, the review interface 412, the list page 415, and/or the search API 418 operate only on the published versions of the objects, and not on the unpublished versions of the objects.

Exemplary Computer-Implemented Method for Managing Metadata

Figure 5:
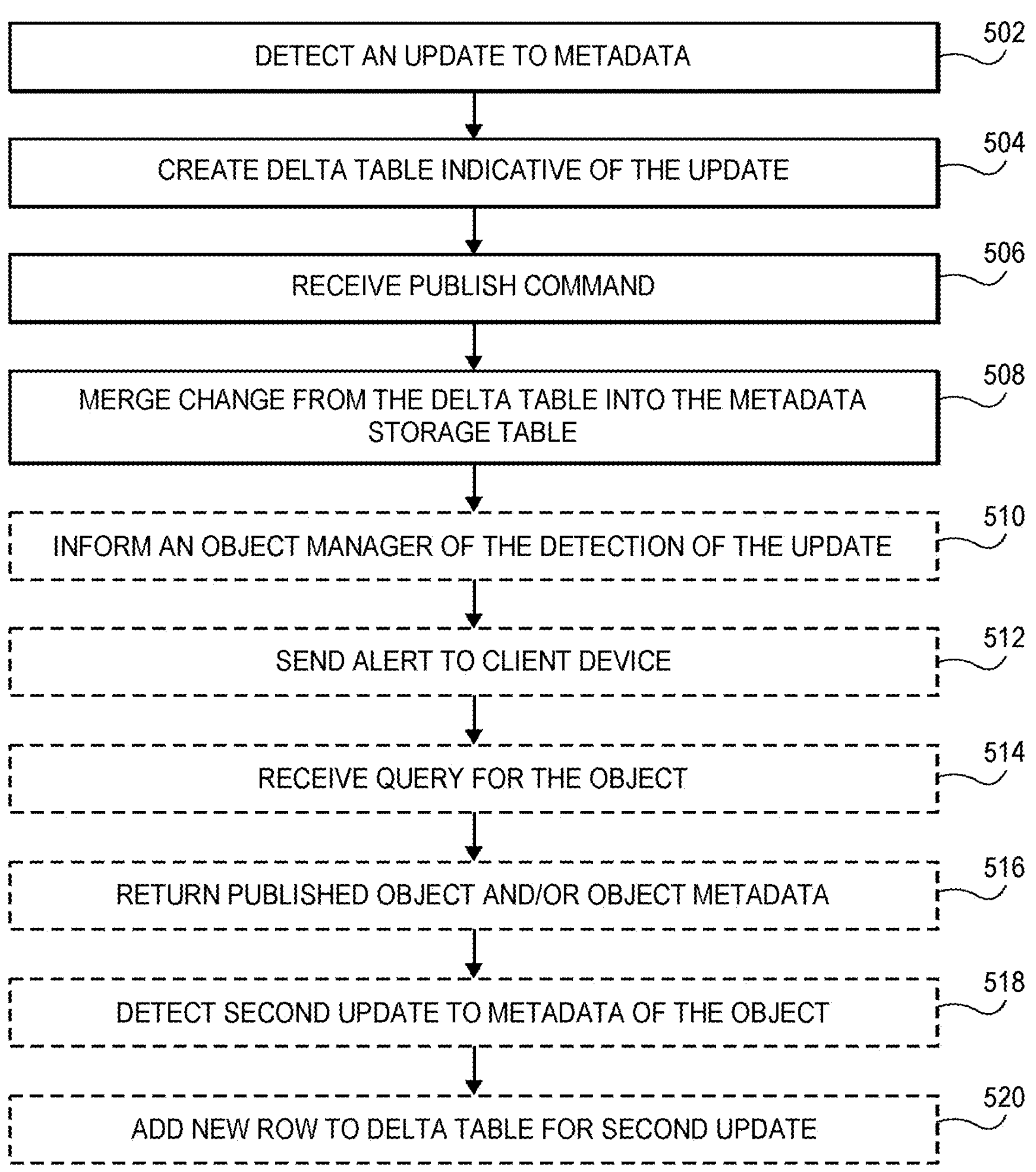
FIG. 5 depicts an example method of managing metadata.

FIG. 5 illustrates a flow diagram representing an exemplary computer-implemented method or implementation 500 for managing metadata. In some examples, the method 500 may be implemented by the server 102. It should be understood that all blocks of the example method 500 are optional. That is, not all blocks are required to be performed.

The example method 500 may begin at block 502 when the one or more processors 120 detect an update to metadata associated with an object maintained in the long-term database 111. The update may be detected by any suitable technique. For example, a user may indicate (e.g., via the I/O 122, the client device 104, etc.) that an object has been updated. In another example, the server 102 periodically searches the long-term database 111 for updates to objects. In yet another example, the server 102 searches the long-term database 111 for updates upon a command to search for such updates. In yet another example, the system may make the detection in response to an updated object being uploaded to the long-term database 111.

In some examples, the object is a communication object (e.g., a communication document). Additionally or alternatively, the object comprises a plurality of component messages, such as a collection of messages captured during a particular time period (e.g., a one-hour time period, a two-hour time period, one-day time period, etc.). The messages may be in any suitable format, such as email messages, SMS messages, multimedia messages, text messages via a particular app, etc.

At block 504, the one or more processors 120 create a delta table 300 indicative of the update to the metadata. In some examples, the delta table 300 has columns of: date; time; message sender; message recipient; privilege; channel of communication; relevancy score; highlighting model; and/or message contents.

In some examples, the delta table 150, 310 indicates an association between the object and the delta table 150, 310. The association may be any suitable association. For example, the association may be a reference, such a hash of the data of the object. There may also be references for individual messages (e.g., associations, such as hashes of messages). In some embodiments, the associating the object and the delta table 150, 310 comprises generating a hash of the object, and including the hash in the row of the delta table 150, 310.

At block 506, the one or more processors 120 receive a publish command (e.g., from the client device 104, etc.).

At block 508, in response to receiving the publish command, the one or more processors 120 merge the change from the delta table 150 to metadata associated with the object in the metadata storage table 110, 300. For example, the one or more processors 120 may replace outdated metadata in the metadata storage table 110, 300 with updated metadata.

At block optional 510, the one or more processors 120 (e.g., in response to the completion of the publication) inform the object manager 112 of the detection of the update. In response, the object manager 112 may update its reference to the object.

At block optional 512, the one or more processors (e.g., in response to the completion of the publication) send an alert to the client device 104 that the object has been updated. The alert may be in any suitable form. For example, the alert may be displayed on a display of the client device 104 (e.g., the I/O 172). The alert may be visual, auditory, and/or haptic.

At optional block 514, the one or more processors 120 receive a query for the object. The query may be received from any suitable source. For example the query may be received from the client device 104, the server 102 (e.g., via the I/O 122, the review interface 412, the object manager 410, the list page 415, and/or the search API 418, etc.).

In response, at optional block 516, the one or more processors 120 may return the published version of the object and/or the object metadata to the requesting source.

At optional block 518, the one or more processors 120 may detect a second update to the metadata.

At optional block 520, in response to the detection of the second update, the one or more processors 120 add a new row to the delta table 150, 310, 460, and add the second update to the new row.

Subsequently, the example method 500 may continue to iterate. For instance, the example method 500 may return to block 502 to detect another update to the object, and/or detect an update to a different object. In some embodiments, if an update to a new object is created, a new delta table 150, 310, 460 is created for the new object.

It should be understood that not all blocks and/or events of the exemplary signal diagrams and/or flowcharts are required to be performed. The exemplary signal diagrams and/or flowcharts may include additional, less, or alternate functionality, including that discussed elsewhere herein.

Other Matters

Although the text herein sets forth a detailed description of numerous different embodiments, it should be understood that the legal scope of the invention is defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

It should also be understood that, unless a term is expressly defined in this patent using the sentence "As used herein, the term '______' is hereby defined to mean . . . " or a similar sentence, there is no intent to limit the meaning of that term, either expressly or by implication, beyond its plain or ordinary meaning, and such term should not be interpreted to be limited in scope based upon any statement made in any section of this patent (other than the language of the claims). To the extent that any term recited in the claims at the end of this disclosure is referred to in this disclosure in a manner consistent with a single meaning, that is done for sake of clarity only so as to not confuse the reader, and it is not intended that such claim term be limited, by implication or otherwise, to that single meaning.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (code embodied on a non-transitory, tangible machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC) to perform certain operations). A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

Upon reading this disclosure, those of skill in the art will appreciate still additional alternative structural and functional designs for the approaches described herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The particular features, structures, or characteristics of any specific embodiment may be combined in any suitable manner and in any suitable combination with one or more other embodiments, including the use of selected features without corresponding use of other features. In addition, many modifications may be made to adapt a particular application, situation or material to the essential scope and spirit of the present invention. It is to be understood that other variations and modifications of the embodiments of the present invention described and illustrated herein are possible in light of the teachings herein and are to be considered part of the spirit and scope of the present invention.

While the preferred embodiments of the invention have been described, it should be understood that the invention is not so limited and modifications may be made without departing from the invention. The scope of the invention is defined by the appended claims, and all devices that come within the meaning of the claims, either literally or by equivalence, are intended to be embraced therein.

It is therefore intended that the foregoing detailed description be regarded as illustrative rather than limiting, and that it be understood that it is the following claims, including all equivalents, that are intended to define the spirit and scope of this invention.

Furthermore, the patent claims at the end of this patent application are not intended to be construed under 35 U.S.C. § 112 (f) unless traditional means-plus-function language is expressly recited, such as "means for" or "step for" language being explicitly recited in the claim(s). The systems and methods described herein are directed to an improvement to computer functionality, and improve the functioning of conventional computers.

What is claimed:

1. A computer-implemented method for managing metadata, the method comprising:

detecting, via one or more processors, an update to object metadata associated with an object maintained in a long-term database;

creating, via the one or more processors, a delta table indicative of the update to the metadata associated with the object, wherein a metadata storage table indicates an association between the object metadata and the delta table;

detecting, via the one or more processors, a publish command associated with the object; and in response to detecting the publish command, merging, via the one or more processors, a change from the delta table to the object metadata associated with the object in the metadata storage table.

2. The computer-implemented method of claim 1, wherein the delta table has columns of: message contents; date; time; message sender; message recipient; privilege; and/or channel of communication.

3. The computer-implemented method of claim 1, wherein the association between the object and the delta table is maintained in a field in the metadata storage table that indicates one or more rows in the delta table that stores the updated metadata.

4. The computer-implemented method of claim 1, wherein the object includes a plurality of component messages from within a time period.

5. The computer-implemented method of claim 1, further comprising sending an alert to a client device that the object has been updated.

6. The computer-implemented method of claim 1, wherein the update to the metadata is made by a processing handler/conversion module, an export module, a processing user interface (UI) module, a coding admin UI, an enrichments module, and/or a production module.

7. The computer-implemented method of claim 1, wherein the publish command is issued by an object manager.

8. The computer-implemented method of claim 1, further comprising:

detecting, via the one or more processors, a second update to the metadata associated with a second object maintained in the long-term database; and creating, via the one or more processors, a second delta table indicative of the second update to the metadata associated with the second object, wherein the second delta table indicates an association between the second object metadata and the second delta table.

9. The computer-implemented method of claim 1, further comprising:

detecting, via the one or more processors, a second update to the metadata associated with the object maintained in the long-term database; and creating, via the one or more processors, a new row in the delta table indicative of the second update to the metadata associated with the object.

10. A computer system for managing metadata, the computer system comprising one or more processors configured to:

detect an update to object metadata associated with an object maintained in a long-term database;

create a delta table indicative of the update to the metadata associated with the object, wherein a metadata storage table indicates an association between the object metadata and the delta table;

detect a publish command associated with the object; and in response to detecting the publish command, merge a change from the delta table to the object metadata associated with the object in the metadata storage table.

11. The computer system of claim 10, wherein the delta table has columns of: message contents; date; time; message sender; message recipient; privilege; and/or channel of communication.

12. The computer system of claim 10, wherein the association between the object and the delta table is maintained in a field in the metadata storage table that indicates one or more rows in the delta table that stores the updated metadata.

13. The computer system of claim 10, wherein the object includes a plurality of component messages from within a time period.

14. The computer system of claim 10, wherein the one or more processors are further configured to send an alert to a client device that the object metadata has been updated.

15. The computer system of claim 10, further comprising an object manager configured to issue the publish command.

16. A computer device for managing metadata, the computer device comprising:

one or more processors; and one or more non-transitory memories, the one or more non-transitory memories having stored thereon computer-executable instructions that, when executed by the one or more processors, cause the one or more processors to:

detect an update to object metadata associated with an object maintained in a long-term database;

create a delta table indicative of the update to the metadata associated with the object, wherein a metadata storage table indicates an association between the object metadata and the delta table;

detect a publish command associated with the object; and in response to detecting the publish command, merge a change from the delta table to the object metadata associated with the object in the metadata storage table.

17. The computer device of claim 16, wherein the delta table has columns of: message contents; date; time; message sender; message recipient; privilege; and/or channel of communication.

18. The computer device of claim 16, wherein the association between the object and the delta table is maintained in a field in the metadata storage table that indicates one or more rows in the delta table that stores the updated metadata.

19. The computer device of claim 16, wherein the object includes a plurality of component messages from within a time period.

20. The computer device of claim 16, wherein the one or more non-transitory memories having stored thereon computer executable instructions that, when executed by the one or more processors, cause the one or more processors to send an alert to a client device that the object has been updated.

* * * * *